United States Patent [19]
Henry

[11] 3,816,943
[45] June 18, 1974

[54] WRITING GUIDE FOR PARTIALLY SEEING, BLIND OR MUSCULARLY DISABLED PERSONS

[76] Inventor: Nadine E. Henry, 7 Kansas Dr., Jackson, N.J. 08527

[22] Filed: Mar. 1, 1973

[21] Appl. No.: 336,906

[52] U.S. Cl. ................................... 35/38, 283/45
[51] Int. Cl. ..................... G09b 11/04, G09b 21/00
[58] Field of Search ............... 35/38, 37, 36; 283/45

[56] References Cited
UNITED STATES PATENTS

| | | | |
|---|---|---|---|
| 205,195 | 6/1878 | Lueken | 283/45 |
| 237,582 | 2/1881 | Newman | 35/36 |
| 274,031 | 3/1883 | Requa | 35/37 |
| 1,012,739 | 12/1911 | Speckel | 35/37 |
| 1,253,758 | 1/1918 | Wilkes | 35/37 |
| 1,290,131 | 1/1919 | Dunsdon | 283/45 |
| 1,371,430 | 3/1921 | Nickerson | 35/38 |
| 2,267,497 | 12/1941 | Farrow | 35/38 X |
| 2,806,299 | 9/1957 | Dubas | 35/37 |
| D244,669 | 8/1972 | Summers | 74/9 A |

*Primary Examiner*—Wm. H. Grieb
*Attorney, Agent, or Firm*—Martha G. Pugh

[57] ABSTRACT

A writing guide for partially seeing, blind or muscularly disabled persons comprises a stiff backing element including means for holding a writing surface substantially immovable, and a flexible flap connected along one edge of the backing element. The latter is constructed to fold flat against the writing surface, and includes one or more lengthwise creases which correspond to desired writing lines on the writing surface. The user folds back the flap along the crease conforming to the line on which he wishes to write, for which the folded edge serves as a guide. Tactile and/or color contrasted markers adjacent each of the creases indicate the limits of the writing area. Disclosed embodiments include guides for writing and endorsing checks, filling out bank deposit and withdrawal slips, addressing envelopes and signing other types of legal documents.

18 Claims, 19 Drawing Figures

WRITING GUIDE FOR PARTIALLY SEEING, BLIND OR MUSCULARLY DISABLED PERSONS

BACKGROUND OF THE INVENTION

This invention relates to writing guides for partially seeing, blind or muscularly disabled persons.

Writing guides for blind, visually impaired or partially sighted persons are well-known in the prior art and take many different forms. The most common forms in use are rigid metal templates provided to blind persons for the signing or filling in of documents, for example by banks or other institutions. These usually include a series of slots or openings corresponding to the areas to be filled in on a check, deposit slip or the like. These are difficult to use because of the rigidity of the material, which prevents the writer from executing loops or other marks which normally extend below the writing line. Another type of writing guide takes the form of a board or chart having a plurality of elongated parallel slots. The latter is placed beneath the paper to be written on. This has the disadvantage of providing an uneven surface for writing which causes the writer to make tears or perforations in the paper. Other prior art variations of writing guides include a type having a plurality of parallel lines comprising a series of embossings or serrated edges which also provide an uneven writing surface. Various other types of drawing and lettering guides are presently available on the market, none of which function in a satisfactory manner for use by visually impaired or muscularly disabled persons because of one or more of the disadvantages mentioned. Moreover, such writing guides as are available are cumbersome to carry and use and unattractive in appearance.

SUMMARY OF THE INVENTION

Accordingly, it is the principal object of this invention to provide an improved writing guide especially adapted for use by persons who are disabled because of visual impairment or lack of muscular control.

A more specific object of the invention is to provide a writing guide for the partially sighted, blind or muscularly diabled which can be readily manipulated by the writer to accommodate marks normally extending below the writing line.

Another object of the invention is to provide a writing guide which is neat, compact and attractive in appearance for carrying in the purse or pocket of the user.

Still another object of the invention is to provide a writing guide which is simple and cheap to fabricate.

These and other objects are realized in writing guides of the type disclosed in the present invention which are especially adapted for use by persons who are blind or otherwise visually impaired or limited in any manner which would prevent them from readily controlling the alignment of their writing.

One embodiment of the invention comprises a writing guide especially adapted for the writing of checks. Such a guide is formed with a stiff rectangular back portion conforming substantially to the shape of the checkbook and having corner holders into which a check to be written is inserted. Extending from one of the broad sides of the stiff back portion is a flexible flap also conforming to the shape of the check and including lengthwise permanent folds conforming to each of the lines on the check. The terminal points of the writing areas on each of the lines are denoted by tactile indicators which take the form of small raised points and/or color contrasted dots or stripes. Thus, in operation the check writer first inserts a check which is held in place by corner pieces or alternative clamping means on the stiff rectangular back portion. He then folds the flexible flap against the face of the check so that the folded edge is aligned with the top writing line. The flap is progressively folded down along preset creases to conform to lower lines on the check until the lowest line is reached which usually accommodates the signature. In each case tactile and/or color contrasted indicators enable the writer to tell by feeling or seeing where the writing should begin and end. Moreover, in instances where marks or loops would normally extend below the line, the writer is able to complete these by lifting the folded portion for this purpose.

It will be understood that guides of the types disclosed are not limited to any particular form or purpose, but that numerous modifications are contemplated. For example, a check writing guide of the type described can be combined with a conventional checkbook holder. In accordance with one modification, the back of the check holder includes an extra elongated pocket extending from its lower edge to within about one-half inch from the top, the upper two inches of the pocket taking the form of a loose flap having several creases parallel to the top. A check to be endorsed is inserted in the pocket and the flap is folded against the upper back face to guide the writer in making one or more lines of endorsement.

In other modifications, guides in accordance with the present invention are adapted, for example, for the filling out of bank deposit and withdrawal slips, addressing envelopes, writing letters, signing of greeting cards or writing notes on the back of same, for the filling out and completing of traveler's checks, for the signing of legal documents and for many other purposes. In each of these cases a guide specifically adapted for the document in question is provided. For example, in the case of bank deposit and withdrawal slips, the flexible flaps are sectioned for folding back separately for entries on different parts of the form. Other modifications include the use of flaps containing windows or depending portions which support small auxiliary flaps for making special entries or for writing return addresses on letter envelopes.

In accordance with another modification of the invention, a writing guide is specifically formed for the use of partially sighted persons by color contrasting various lines of the flexible portion of the guide in order to assist the writer in correlating the material filled-in in particular spaces on a check or other form.

Further modifications include a guide with a short detachable flap, which can be disengaged from one position on the page and reengaged in another position lower down on the page by fastening a pair of tabs in slots on opposite lateral edges of the backer. In another simplified form of guide, primarily useful for writing signatures, a flexible flap slightly longer than the writer's signature, only an inch or two wide and having a lengthwise crease, is provided with a roughened undersurface. The flap is thus held immobile relative to the writing surface, and folded back to form a guide for the writer's signature.

A particular advantage in the use of guides of the types disclosed are that they enable persons who are blind or whose vision is limited or who are subject to certain muscular spasms to produce a finished writing product which approximates that of the normal writer. This enables such a person to become self-sufficient in carrying on routine business operations, such as involved in writing checks or making bank deposits, etc. One feature of the writing guide in question is that it may be formed of brightly colored plastic or similar material to provide a compact body, attractive in appearance, which can be readily carried in the pocket or purse of the user. Moreover, writing guides of the types disclosed can be readily formed on a mass production basis from relatively inexpensive materials.

Other objects, features and advantages of the invention will be better understood by reference to the drawings hereinafter and the detailed description of the invention.

BRIEF DESCRIPTION OF THE DRAWINGS

FIG. 12 shows a further modified form of the check writing guide of the present invention which has color contrasted sections to enable a partially sighted person to distinguish areas to be filled-in;

DETAILED DESCRIPTION OF THE DRAWINGS

Figures 1A, 1B, 1C:
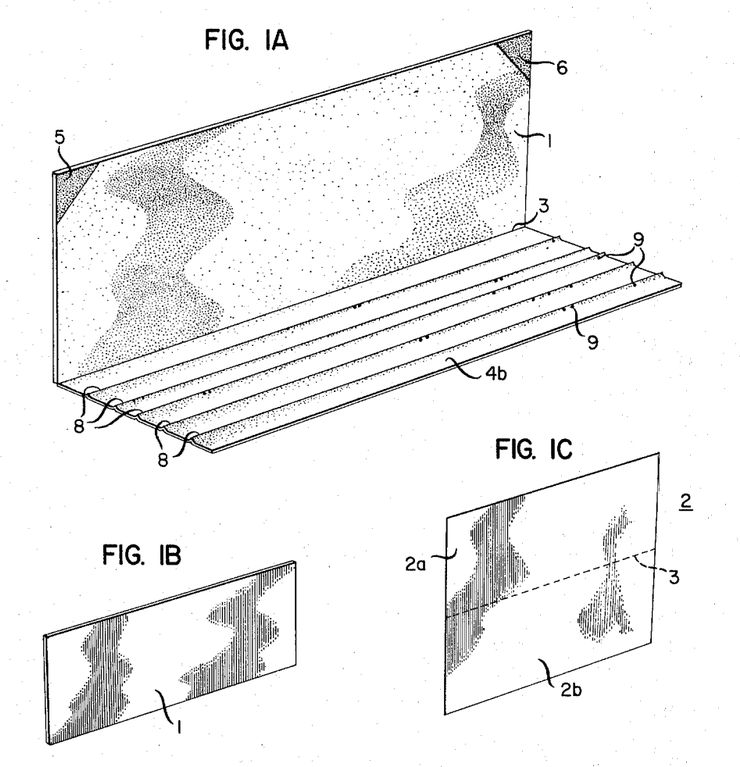
FIG. 1A shows, in perspective, the writing guide of the present invention as specifically applied to the writing of bank checks.
FIG. 1B shows a stiff backing element for the bases of the check writing guide of FIG. 1.
FIG. 1C shows a heavy paper component to be applied to the backing element of FIG. 1B.

FIG. 1A shows an embodiment of the invention comprising a guide specifically adapted for use in conjunction with the writing of checks which is constructed in the following manner.

A piece of cardboard 1 or other stiff material is cut the length and width of a conventional check, which may be 2¾ inch by 6 inch. A heavy grade of paper (sheet 2) is cut to dimensions of 5½ inch by 6 inch (see FIG. 1C). This is folded in half, so that it measures the length and width of backer element 1; and is then placed on the surface of cardboard element 1 so that the edges fit evenly together. The folded edge of the sheet 2 is then taped or otherwise secured to one of the long edges of cardboard element 1. The folded sheet 2 is then unfolded and a single top edge and corresponding left and right edges are taped to the other edge of the element 1. Sheet 2 is then refolded and the folded edge firmly rolled to enforce the crease.

Figure 1D:
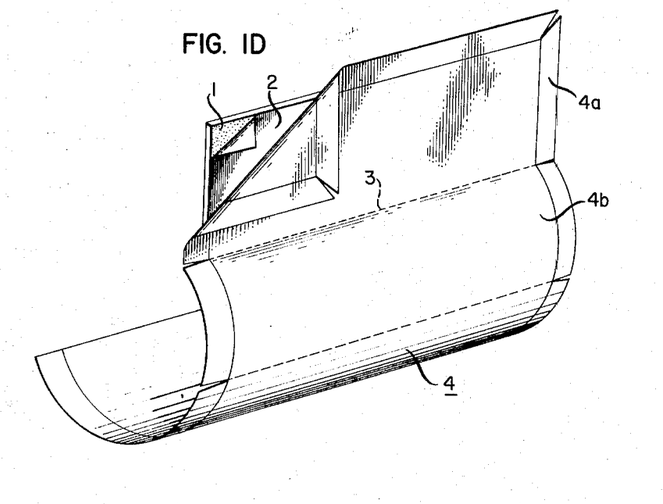
FIG. 1D shows a plastic covering sheet in combination with the heavy paper component of FIG. 1C and the backing element of FIG. 1B in the process of fabrication.

A sheet 4 of self-adhesive vinyl plastic having a non-adhesive adhering sheet is then cut to a dimension 7 inch by 12 inch and placed with its upper end against the inside surface of sheet 2 in such a manner that it extends ¼ inch to ½ inch beyond the top edge and ¼ inch to ½ inch beyond each of the two adjacent sides. The vinyl plastic sheet 4 may be held in place mechanically during the process by any available means, such as by paper clips or the like. The upper left and right corners are cut diagonally to the corners of cardboard element 1. At this point the paper clips are removed, and a portion of the adhering sheet is peeled off of vinyl sheet 4, which is slit at the edges even with crease 3. This portion of the vinyl is then pressed smoothly against the upper portion of 2a supported by backer 1 above crease 3. The overlapping portions at the top and sides of 2a are pressed to adhere smoothly to the back side of backer 1.

A stylus is run back and forth through the crease 3 to insure a proper fold. The adhering sheet on an additional 2¾ inches of the vinyl plastic sheet 4 is then peeled off and cut free. The portion 2b of the heavy paper component 2 is then placed smoothly around a one-inch diameter tube and held firmly in place while the measured portion of adhesive plastic of sheet 4 which has been peeled off and cut free is pressed firmly on the outside of the curved paper. The paper flap 2b with plastic adhering to its upper face is now fitted smoothly to the inside of the 1-inch diameter cardboard tube cut lengthwise in half and held firmly in place while adhesive plastic is smoothed in place on the under side. This curved technique is necessary to prevent the plastic from buckling later when the flap is creased.

The plastic covered flap 4b and the remaining portion of the plastic, still retaining an adhering sheet, are measured together and the overlapping side edges of the plastic are cut to correspond to the dimensions of the cardboard backing element 1. The adhering sheet is then peeled off and the remaining part of plastic sheet 4 is smoothed into place, covering the entire back side of the backing element 1 with the exception of the last inch. Corner pieces 5 and 6 are then made by cutting squares from adhesive plastic which are 1½ inches on a side, cutting the same diagonally in half and folding the apex of each triangle to the center of the base on the sticky side. One of these corner pieces is placed with the doubled portion diagonally across each of the upper corners so that the sticky tabs are folded against the back side. With the corners 5 and 6 properly attached, the remaining inch of plastic covering is smoothed into place on the back side of the guide.

If the guide is properly constructed a check can be fitted therein by sliding the upper left- and right-hand corners beneath the corner pieces 5 and 6. The check should fit without any play from top to bottom or from left to right, the bottom edge of the check fitting perfectly against the crease 3.

The front cover or flap 4b should lie flat over the face of the check. The guide is then completed by folding the front cover or flap 4b starting with the bottom line to form creases 8 which correspond to the horizontal writing lines of a check of the form to be used. These creases are reinforced by running a stylus back and forth along them. To indicate where the writing is to begin and end, raised dots or tactile indicators 9 are pressed into the plastic with a stylus on the creases 8 corresponding to each of the writing lines.

Figure 2:
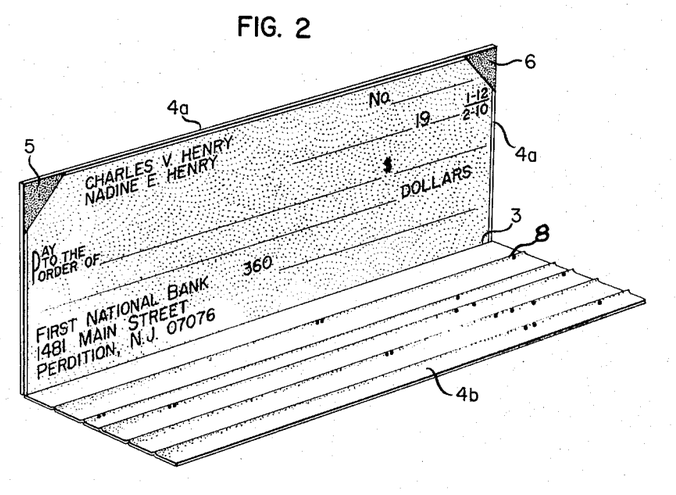
FIGS. 2, 3, 4, 5, 6 and 7 show a progression of the positions in which the writing guide of the present invention is applied to writing a check.

In order to use a check writing guide of the type illustrated in FIG. 1A, a conventional check is placed face up against the backing element 1 of the guide with the bottom conforming to the crease 3 and the upper right- and left-hand corners of the check inserted beneath the corner pieces 6 and 5. This is shown in FIG. 2.

Figure 3:
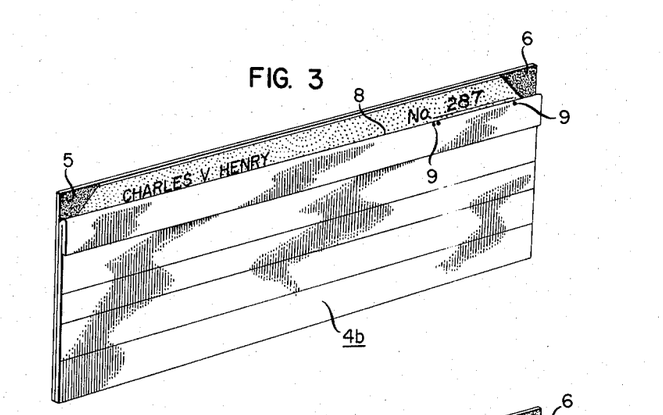
Figure 4:
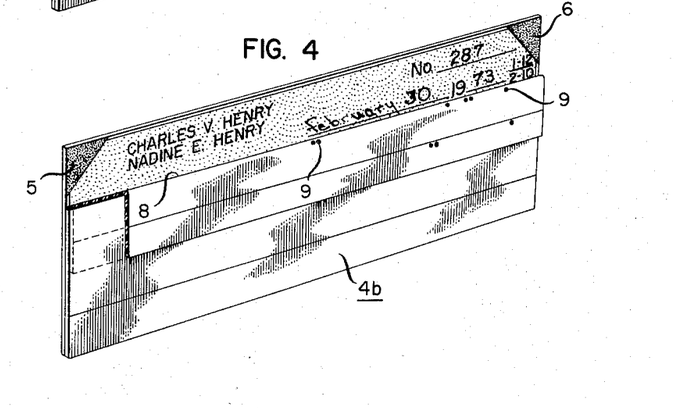

As shown in FIG. 3, the front surface portion 4b of the check writing guide is then folded at the crease 3 so that the flexible portion 4b completely covers the face of the check. The cover is then held by the top edge at both ends so that the fingers are on the inside surface and the thumbs are on the outside surface. The fingers are moved down from the top edge until the first of the creases 8 on the cover 4b is located. The thumbs on the outside are then moved to locate the same crease. The flexible portion 4b is then folded back outwardly against this crease so that the latter corresponds to the top line on the check where the number is written. The beginning of the writing line is located by sliding a finger along the crease until the first of the tactile indicators 9 is located. Another of the tactile markings 9 is present at the end of the same crease. The flap is then folded back to the next crease, as shown in FIG. 4, and additional tactile markings are located by the fingers. Between the first two markings the month and day are written. A third tactile marking along this crease indicates where the writer begins the last two numbers of the year, since the number 19 is usually printed on the checks. The fourth tactile marking along this crease indicates where the year line ends.

Figure 5:
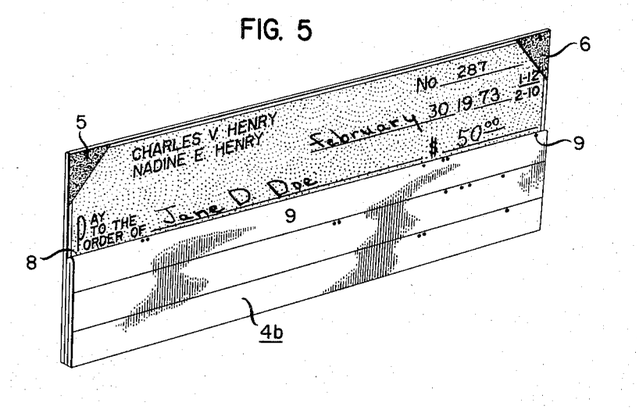
Figure 6:
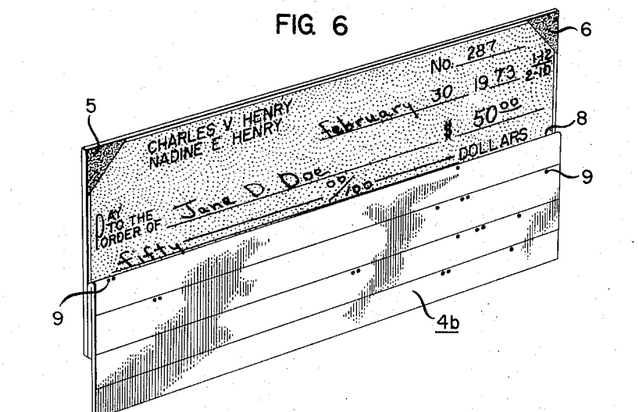
Figure 7:
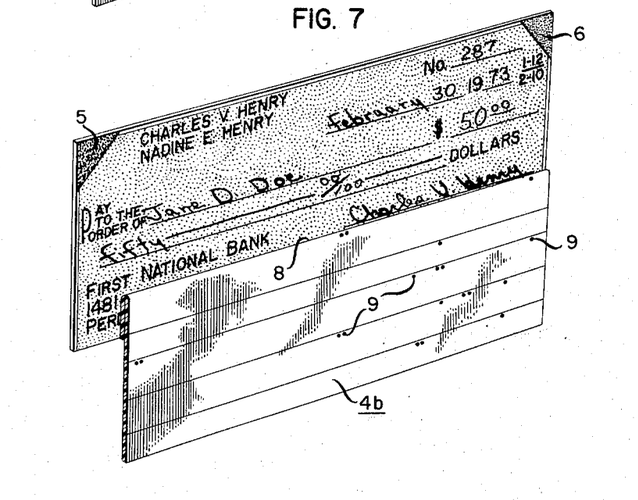

As shown in FIG. 5, the guide cover 4b is then moved to the next one of the creases 8 corresponding with the third line on the check by folding back, as shown, or progressively forming a flat roll. This is best accomplished by placing the fingers on the inside of the cover and the thumbs on the outside in the writing crease previously used. While lifting the cover the fingers are moved downward to locate the second crease and the flexible portion 4b is folded along this second crease. The first of the tactile markings 9 along this crease indicates where the name of the payee should begin and the next tactile marking shows where the payee's name should terminate. A third tactile marking indicates where to begin writing, in figures, the amount to be paid. The fourth tactile marking indicates where the figure amount should end. The flexible portion 4b is then folded down as shown in FIG. 6 at the fourth one of the creases 8 in the manner described above and the tactile markings along this crease are located to show the beginning and end of the written words indicating the amount to be paid. The flexible portion 4b is then folded down to the last line (FIG. 7) where tactile markings 9 indicate the points for beginning and ending the writer's signature.

Figure 8:
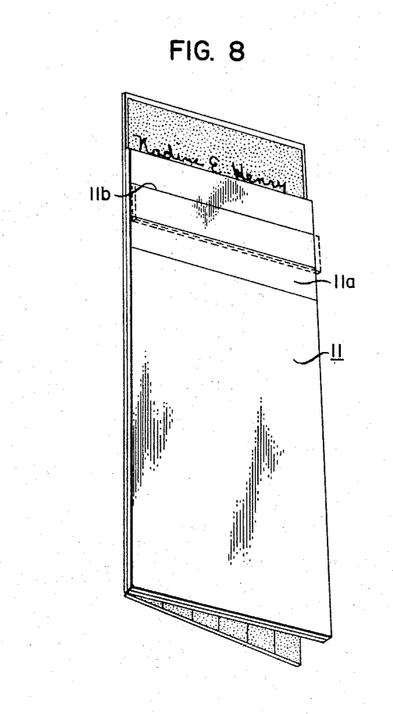
FIG. 8 shows a modification of the back of the writing guide of FIG. 1 for use in endorsing checks.

It will be apparent that the check is held firmly in place during this entire procedure by the corner pieces 6 and 5 which prevent slippage. the flexibility of the guide portion 4b permits the writer to lift up the guide in order to extend below the writing line the loops which are normally appended to such letters as f, g, j, p, q and y. It will be seen that the guide indicated in FIGS. 1, et seq. is light of construction and can be readily fashioned from attractive colors which match the accessories of the user. Moreover, it is contemplated that the guide can be permanently attached as part of the checkbook assembly of the user as indicated in FIG. 2. Assuming this is done, it is contemplated, as another variation, that a pocket or flap 11, substantially conforming to the shape of the check (FIG. 8) can be attached longitudinally to the back of the checkbook for enabling the check to be readily endorsed. The flap 11 is attached at the bottom end and at its two sides to a point three-quarters of the length of the backing element. The upper portion takes the form of a loose flap 11a, which will include a series of creases 11b which will be formed in a manner similar to the creases 8 on the flap 4b used in connection with the filling out of the face of the check. A check to be endorsed is slipped into the pocket 11, making sure that the end to be endorsed protrudes from the top. The flap 11a is then folded down progressively (in the same manner as the flap 4b on the face of the check) to permit the writer to endorse the check with his name and any other necessary information on successively lower lines.

It will be apparent that there are many different types of modifications that can be made of the writing guide of the present invention in order to assist in writing many types of documents.

Figure 9:
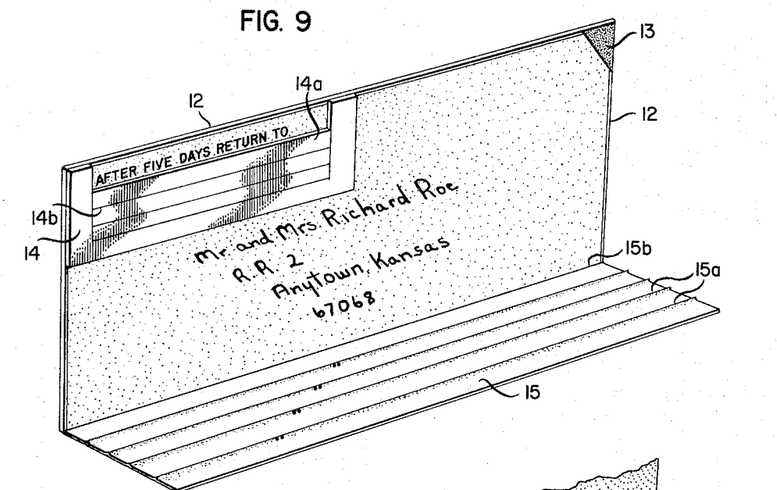
FIG. 9 shows a modified form of the writing guide of the present invention for use in addressing envelopes.

One of the most useful forms is that indicated in FIG. 9 of the drawings for addressing ordinary envelopes. This comprises a stiff backing element 12 which corresponds in shape to the size of the envelope to be addressed and is formed in a manner similar to the backing element 4a of FIG. 1A. Across the upper right-hand corner is a corner piece 13 similar to the corner piece 6 of FIGS. 1A and 2. In the upper left-hand corner, instead of a corner piece there is appended therefrom a plastic frame 14 which is rectangular in shape and slightly large than the extent of the return address on the envelope. The plastic frame 14 is fixed to the top and the left-hand side of the backing element 12. Internally it is cut out to form a flap 14a which is fixed at its lower end and folds downwardly, conforming approximately in size to the return address. This contains a series of parallel creases 14b, each of which conforms exactly to the position of one of the lines of the return address. Thus, the return address can be executed by folding the flap 14a to successively lower creases. The lower portion of the guide consists of a plastic flap 15 which is substantially similar to the flap 4b of FIG. 1. It corresponds in length to the length of the backing element 12 and has a lengthwise crease 15b at the bottom of the backing element 12. The flexible flap 15 contains a series of lengthwise creases 15a which, in the manner of the check writing guide, conform to the lines to be written. These may include a first fold for the name of the addressee and second, third and fourth folds for the lines of the address. It need be only wide enough to extend far enough against the face of the letter to enable the name of the addressee to be written.

Figure 10:
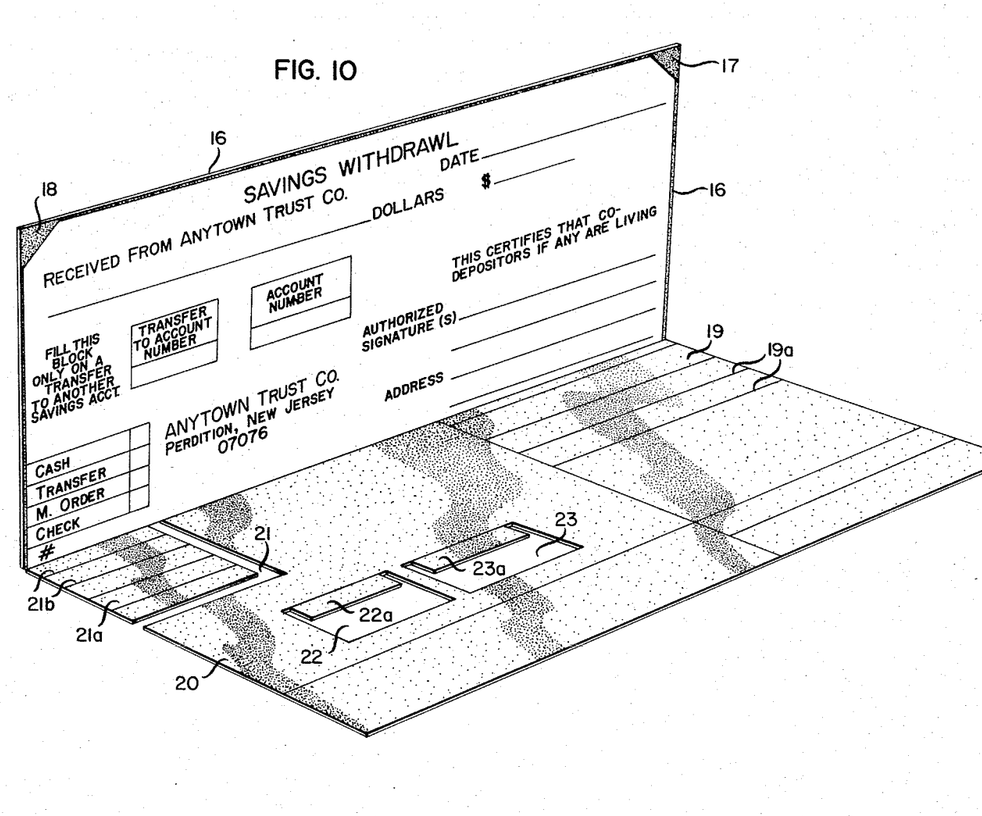
FIG. 10 shows a further modification of the writing guide of the present invention to be used in filling out a savings withdrawal slip.

A further modification is shown in FIG. 10 of the drawings. The form indicated may be used, for example, by banks or savings institutions. It has a rigid backing element 16 similar to the other guides described into which is fitted the deposit or withdrawal form under the corner pieces 17 and 18. Appended to the bottom are a pair of flexible flaps 19 and 20. The flap 19 is on the right-hand side and includes a series of creases 19a which are folded against the face of the form for indicating the date, the amount to the withdrawn and the authorized signature and address, all of which are indicated in the right-hand side of the form. The left-hand flap 20 includes a series of windows 21, 22 and 23. The flap 21a, which fits into the window 21, contains a series of creases 21b which correspond to the indications on the form above. Similar flaps 22a and 23a correspond to the line for indicating transfer account number or account number. In addition to the printing on the face of the withdrawal form, the guide may include Braille indications for apprising the blind or partially sighted person as to the information requested.

Figure 11:
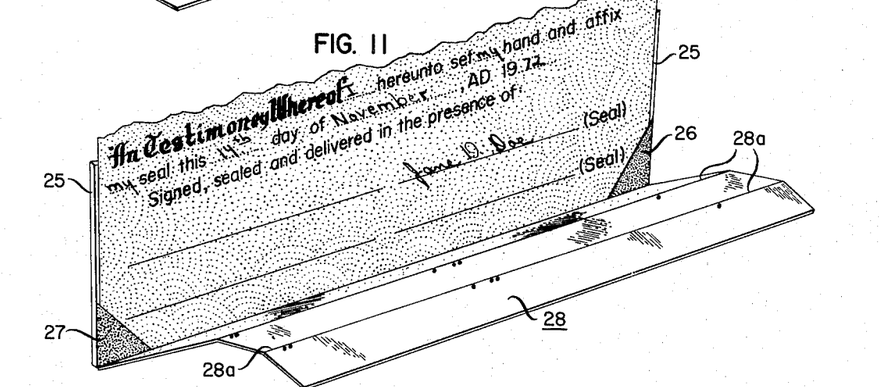
FIG. 11 shows a modified form of the guide of the present invention to be used in signing legal documents.

It is also apparent that a similar type of guide is adapted for the filling in of many different types of legal documents such as indicated, for example, in FIG. 11 in which the backing element 25 conforms to the size of the document to be signed and may be retained in the lawyer's office. This has a series of corner pieces 26 and 27 which hold the document firmly in place and a flap 28 having a series of creases 28a which are folded against the face of the document and which conform to the lines to be signed.

Figure 12:
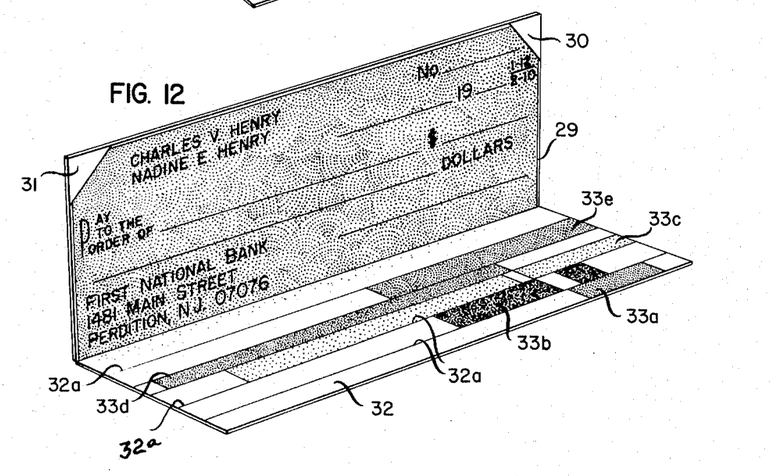

FIG. 12 is a modified form of the check writing guide of FIGS. 1A, 1B, 1C, 1D and 2 which is especially adapted to the use of partially sighted persons. It contains a backing element 29 having corner pieces 31 and 30 in which a check to be filled out is held in place. As in the formerly described check writing guides of FIGS. 1A, 1B, 1C, 1D and 2, the flexible flap 32 has a series of creases 32a corresponding to the lines to the filled in. As a substitute for the tactile indicators 9 of FIGS. 1A, 1B, 1C, 1D and 2, this embodiment has a series of color coded areas 33a, 33b, 33c, 33d, 33 e, etc., each represented by a different color corresponding to a different area on the check to be filled in for guidance of partly sighted persons. If desired, the boundaries of these areas can also be delineated by tactile indicators, as in the previously described embodiments.

Figure 13A:
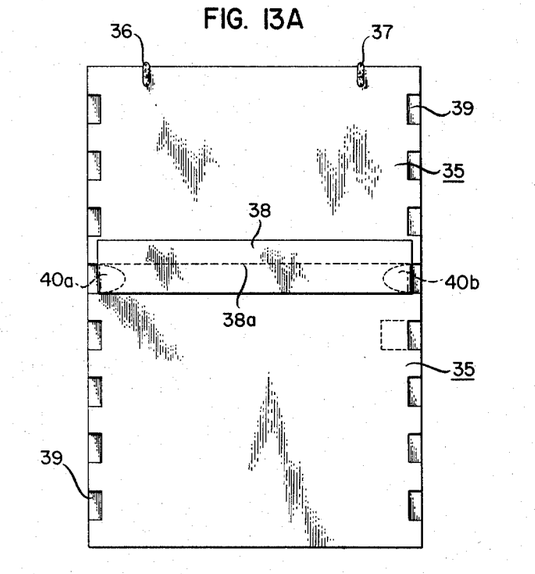
FIG. 13A shows another modified form of writing guide having a detachable flap, which is indicated separately in FIG. 13C.
Figure 13B:
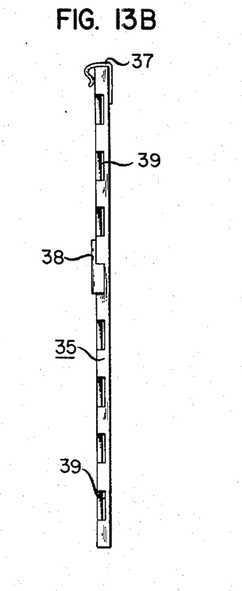
FIG. 13B is an end elevational showing of the modified guide of FIG. 13A.
Figure 13C:
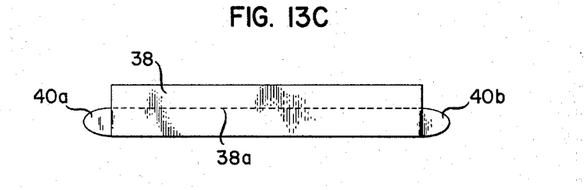

The combination guide shown in FIGS. 13A, 13B and 13C is particularly adapted for letter writing or writing greeting cards. This comprises a stiff backing element 35, comprising cardboard covered with rigid plastic, or the like. At the top, near the right- and left-hand edges, as an alternative to the corner pieces shown in the other embodiments, this embodiment may have a pair of small spring loaded clamps 36 and 37 which may be about the size of small bobby pins, for holding the writing paper in place. The detachable flap 38, which is formed in the manner of the flaps previously described to have a permanent lengthwise crease, extends the width of the backer and is about 2 inches wide in the long direction of the page. At the two ends near the lower edge of flap 38 are a pair of tabs 40a, 40b, as shown in FIG. 13C, of stiff plastic or metal which bend inwardly on each side to fit into a series of edgewise slits 39 as indicated in FIG. 13B. These slits are positioned so that the flap can be progressively moved down the page, at each level being folded over to provide a guiding edge, as in the earlier described embodiments.

Figure 14:
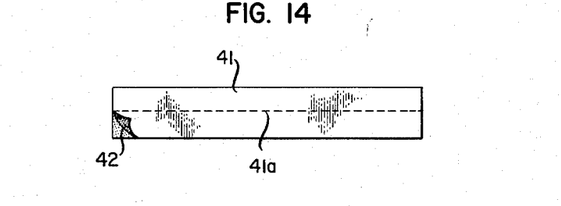
FIG. 14 is a simplified guide to be used primarily for signatures.

A simplified signature guide is indicated in FIG. 14. This comprises a detached flap 41 of plastic, or the like, similar in structure to the flap 4b of the check guide, or the flap 28 of the legal document guide, except that it is not attached to a backer. Instead, the under side 42 of detached flap 41 is slightly roughened to provide frictional contact so that it does not slip when positioned on a page to be signed. It has a single permanent crease 41a along which flap 41 is folded over to serve as a signature guide.

It will be apparent to those skilled in the art that the invention is not limited to the particular forms shown by way of illustration but is only defined by the scope of the appended claims hereinafter.

What is claimed is:

1. A writing guide for assisting visually impaired or otherwise disabled persons to make correctly positioned handwritten entries on a writing surface which comprises in combination:
    a stiff backing element,
    means for holding the writing surface in a writing position substantially free from movement relative to said backing element,
    a flexible flap appended to said backing element and constructed and arranged to be folded against the force of said writing surface disposed in writing position on said backing element,
    said flexible flap comprising one or more permanent creases conforming to one or more preferred writing lines on said writing surface, said flexible flap constructed and arranged for progressive folding along each said crease to provide a guide for writing on a corresponding one of said writing lines.

2. The combination in accordance with claim 1 wherein one or more tactile indicators are positioned adjacent each said crease to indicate where the writing should begin and end.

3. The combination in accordance with claim 2 wherein said writing guide is specifically designed for the writing of bank checks,
    wherein said means for holding the writing surface in a writing position is designed and shaped to hold a conventional bank check, and
    wherein said flexible flap substantially conforms in width to said means for holding said checks and includes a plurality of creases extending lengthwise across said flap, each said crease conforming exactly when in a folded position against said writing surface to one of the lines to be filled in on said check.

4. The combination in accordance with claim 3 wherein the back of said means for holding said writing surface contains an additional pocket constructed to receive a check in longitudinal position for endorsement, said pocket terminating at its upper edge in a flap positioned to conform in folded position to one or more lines appropriate for said endorsement.

5. The combination in accordance with claim 3 wherein said writing guide is formed in combination with a conventional checkbook holder, one cover of said holder serving as said backing element.

6. The combination in accordance with claim 4 wherein said writing guide is formed in combination with a conventional checkbook holder, one of the covers of said holder serving as said backing element and one of the covers thereof containing said additional pocket.

7. The combination in accordance with claim 2 wherein
said means for holding the writing surface in a writing position is designed and shaped to hold a conventional bank deposit or withdrawal form, and
wherein said flexible flap comprises a plurality of sections constructed to be folded separately to accommodate lines extending only part of the length of the form.

8. The combination in accordance with claim 7 wherein at least one said flap section contains one or more openings each having a small flap constructed to be folded against the face of said form to conform to a space for making a specific entry of limited lateral extent.

9. The combination in accordance with claim 1 wherein
said means for holding the writing surface in a writing position is designed to accommodate a conventional mailing envelope, and
wherein said flexible flap substantially conforms in width to said means for holding said writing surface and includes a plurality of creases extending lengthwise across said flap, each said crease conforming when in a folded position to a line for addressing said envelope.

10. The combination in accordance with claim 9 wherein the upper left-hand corner includes a depending portion connected at its upper and left-hand edges to said means for holding the envelope and constructed to fit over the upper left-hand corner of said envelope, said depending portion including an auxiliary flap connected at the bottom edge thereof, said flap having a plurality of parallel lengthwise creases which are constructed to be successively positioned to conform to preferred lines for the return address for said envelope.

11. The combination in accordance with claim 10 wherein tactile indicators are interposed adjacent each of the lines of said flexible flaps to indicate the beginning and end of each said line for addressing said envelope, and for indicating a return address on said envelope.

12. The combination in accordance with claim 1 wherein
said means for holding the writing surface in a writing position is designed and shaped to hold a legal document, and
wherein said flexible flap is constructed and arranged for folding against the face of said document and containing at least one lengthwise crease constructed to be folded to conform to a preferred line for signing said document,
and tactile indicators adjacent said last-named crease to indicate the beginning and ending of the preferred position for signing said document.

13. The combination in accordance with claim 1 especially adapted for use by partially sighted persons wherein
said flexible flap comprises a plurality of color sections of contrasting colors, each differently colored section indicating the boundaries of a specific area to be filled in on said writing surface.

14. The combination in accordance with claim 1 wherein said writing guide is specifically designed for letter writing, and said flexible flap substantially conforms to the shape of the writing surface and contains a plurality of permanent creases extending the width of said flap and substantially equally spaced apart over the length of said flap, said creases conforming in position to desired lines on said letter writing page.

15. The combination in accordance with claim 1 wherein said writing guide includes Braille indications for apprising the blind or partially sighted person as to the information requested.

16. A writing guide for assisting visually impaired or otherwise disabled persons to make correctly positioned handwritten entries on a writing surface which comprises:
a flexible flap having a length slightly exceeding the space required for a conventional signature, and a width not exceeding several inches, said guide including at least one permanent lengthwise crease constructed to serve as a signature guide,
means for securely holding one edge of said flap substantially immobile relative to said writing surface, said means comprising a roughened surface on at least a portion of the reverse face of said flap for maintaining frictional contact with said writing surface,
said flexible flap comprising means for forming a semi-flexible edge conforming to one or more writing lines of said writing surface, which edge is readily lifted to accommodate marks made by the writer below the said writing lines.

17. The combination in accordance with claim 16 comprising means for holding the writing surface in a writing position substantially immobile relative to said backing element, said means including:
coordinated pairs of slots on opposite lateral edges of said writing surface,
said flexible flap being detachable from said means for holding the writing surface, and said flap including at each opposite lower end a tab, the tabs constructed and arranged to fit in progressive positions in said pairs of slots whereby said flap can be moved from one position to another along the length of said writing surface, the said permanent crease therein conforming to successive lines on the said writing surface.

18. The combination in accordance with claim 17 whereby said means for holding the writing surface in a writing position includes spring loaded clamping means on the upper end of said holding means.

* * * * *